June 25, 1957 M. HARLEY 2,796,692
NON-SNAG FISH HOOK
Filed June 11, 1956

*INVENTOR.*
MAX HARLEY
BY
Cullen and Canton
ATTORNEYS

# United States Patent Office 2,796,692
Patented June 25, 1957

2,796,692

NON-SNAG FISH HOOK

Max Harley, Detroit, Mich.

Application June 11, 1956, Serial No. 590,630

1 Claim. (Cl. 43—42.04)

This application relates to non-snag fish hooks.

The fish hook combination hereof comprises a lure, a leader, and a hook assembly wherein a releasable connection is located at the rear end or tail of the lure and at the bight portion of the hook assembly whereby the hook assembly is so positioned during its normal travel behind the forwardly moving lure that the hook assembly will not snag on weeds and other objects in the water.

An understanding of the device I have invented may be obtained from reference to the appended drawing which shows a preferred embodiment.

Figure 1:
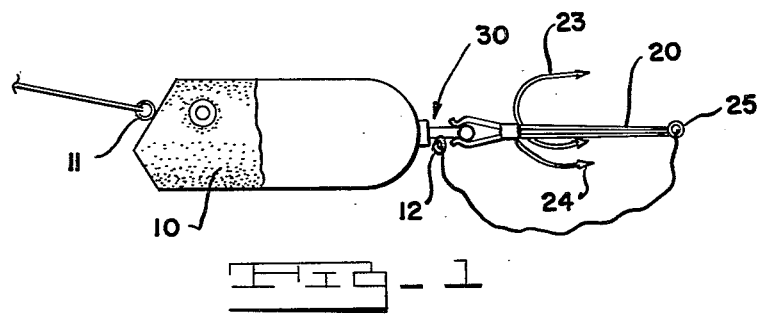
Fig. 1 shows the combination lure, leader and hook assembly in normal position.
Figure 3:
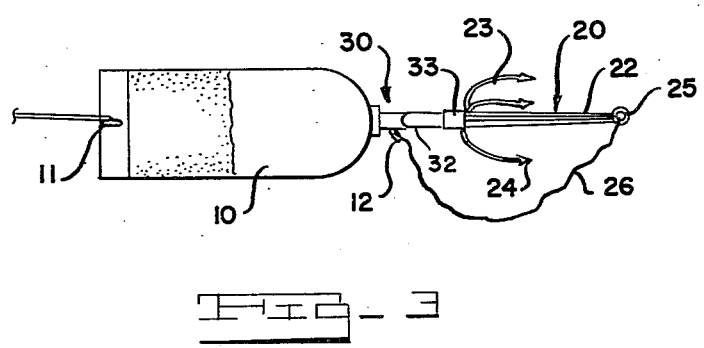
Fig. 3 is a top plan view of a portion of Fig. 1.

Referring to the drawing, it will be seen that Figs. 1 and 3 show a fish hook and lure combination comprising a lure 10 having eyes 11 and 12 at its forward and rear end. The combination also includes a hook assembly having three hooks 21, each of which includes a shank 22, a bight 23, and a barbed end 24 with an eye 25 which enables a leader 26 to connect the hook assembly 20 to the lure 10. A quick and easy release connection means 30 on the rear end of the lure and on the bight end of the hook assembly enables the bight portion of the hook assembly to be releasably connected to the rear end of the lure as shown in Figs. 1 and 3, and with the connection means being such as to release immediately upon the strike of the fish upon the hook.

The means 30 in the preferred form comprises a male element 31 secured to the rear end of the lure 10 and adapted to cooperate with a female gripping element 32 of spring-jaw form which has its base formed as a body 33 which functions not only to provide a base for the jaws 32 but which also functions to hold immovably together the bight ends 23 of the hooks 21 in one unitary assembly.

Figure 2:
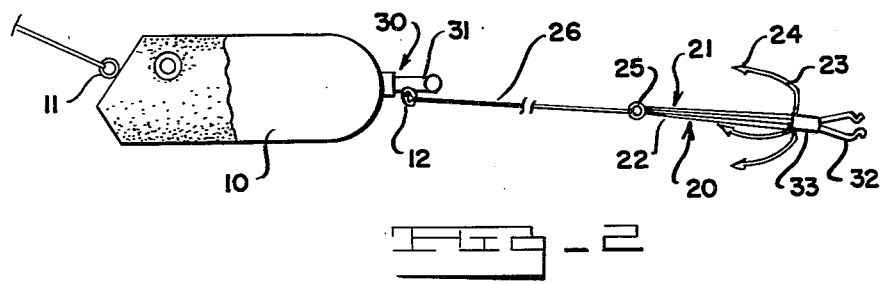
Fig. 2 shows the parts in the position they occupy at the moment a fish strikes.

Fig. 1 shows the normal relationship of my preferred embodiment. Fig. 2 shows the relationship of the hook assembly and lure immediately after a fish has struck to release the connection means 30.

Now having described the hook and lure combination herein disclosed, reference should be had to the claim which follows:

I claim:

A fish hook and lure combination comprising a lure, a hook assembly having one or more hooks, each having a shank, a bight, and a barbed end, a leader connecting the rear end of the lure to the shank of the hook assembly, and means comprising a quick and easy release connection means on the rear end of the lure and on the bight end portion of the hook assembly enabling the hook assembly to be releasably connected at its bight to the rear end of the lure, the connection means being such as to release immediately upon the strike of a fish upon the hook.

References Cited in the file of this patent

UNITED STATES PATENTS

| | | |
|---|---|---|
| 2,246,757 | Rosegard | June 24, 1941 |
| 2,275,869 | Seaton | Mar. 10, 1942 |
| 2,746,200 | Dale | May 22, 1956 |